Dec. 28, 1948.  S. ARGYRIS  2,457,430
ELECTRIC BICYCLE
Filed Feb. 20, 1946
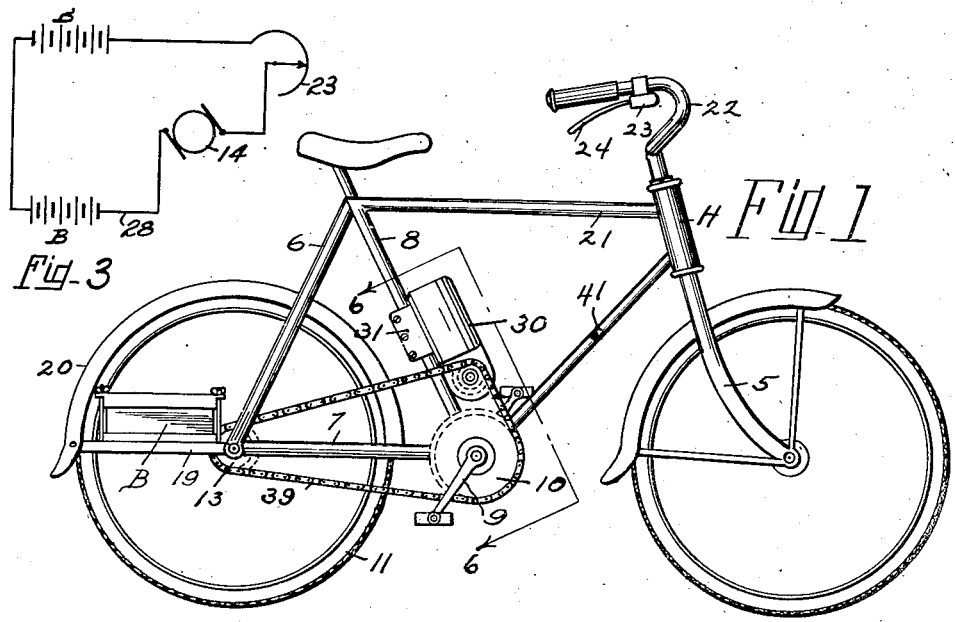
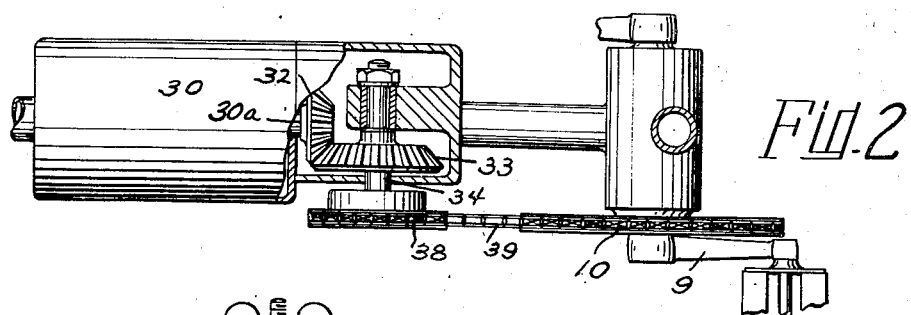
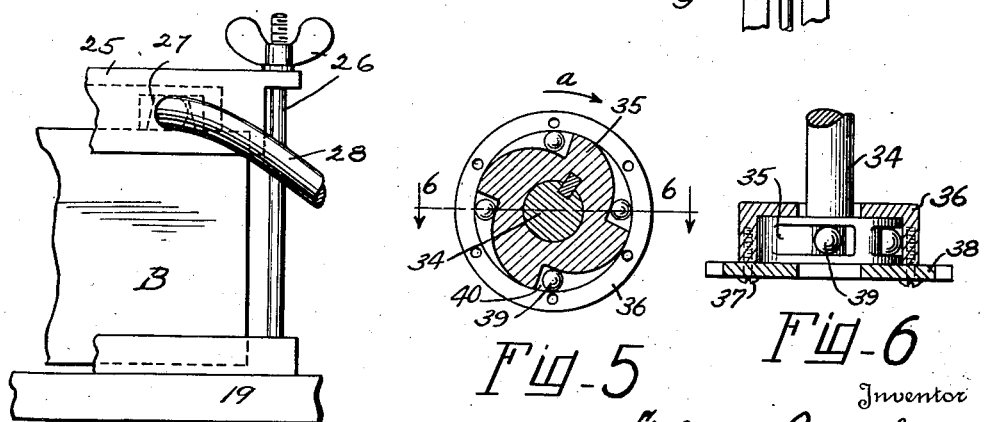
Inventor
Stefanos Argyris
By Shepherd & Campbell
Attorney Patented Dec. 28, 1948

2,457,430

UNITED STATES PATENT OFFICE 2,457,430

ELECTRIC BICYCLE

Stefanos Argyris, New York, N. Y.

Application February 20, 1946, Serial No. 648,971

2 Claims. (Cl. 180—34)

1

The object of the invention is to provide means for easily and quickly attaching electrical propulsion means to existing conventional bicycles. Attempts have been made in past years to propel bicycles by electric motors and batteries. However, the great weight of the batteries, the rapidity with which they became exhausted and the long time required to re-charge them has heretofore discouraged efforts to provide this form of propulsion for light weight bicycles.

The time has now come when it is possible by means of my improvements to successfully provide electric propulsion for bicycles. The quick charge apparatus now found at almost every automobile garage and filling station renders it possible to re-charge batteries in a few minutes, while the recent war has resulted in the aircraft industry developing batteries much lighter than those heretofore available. Aside from the foregoing improvements I now provide means for relieving the battery of its greatest drain, to wit, the heavy load imposed thereon while starting the bicycle from a position of rest and until it picks up speed. I further provide means by which the rider may manually assist the motor on steep hills, when desired.

The invention will be understood by reference to the accompanying drawings, wherein:

Figure 1 is a side view of a bicycle incorporating a modified form of the invention;

Figure 2 is a front elevation of the motor looking from the position indicated by line 2—2 of Figure 1;

Figure 3 is a diagrammatic view of electrical connections, hereinafter described, and Figure 4 is a detail view of a battery support, hereinafter described.

Fig. 5 is a detail view partly in section of an overrunning clutch, hereinafter described and Fig. 6 is a sectional view on line 6—6 of Fig. 5.

Like numerals, designate corresponding parts in all of the figures of the drawings.

Figure 1 illustrates a conventional light weight bicycle of the type embodying front forks 5, rear forks 6 and 7, post 8, pedals and pedal cranks 9, driving sprocket wheel 10 that is turned by the pedals, rear wheel 11 that is driven from sprocket 10 through chain 39 and rear sprocket 13 with which latter sprocket is incorporated the conventional coaster brake of a nature to permit free wheeling of rear wheel 11 in a forward direction and application of the brake upon reverse movement of the pedals. All of the foregoing are well known and conventional parts and require no further description.

The battery or batteries for supplying energy to the motor may be supported in any desired place. They may be supported in front of the head H, as shown in my co-pending U. S. Patent Number 2,397,115. In the present case I have shown a supporting plate 19 of non-corrosive and non-

2 conductive material extending between the rear ends of the rear forks 6 and 7 and the mudguard 20. Many ways may be resorted to for supporting the batteries and the invention is not limited in this respect. They may be hung from the top frame bar 21 or supported from the rear forks 7. I preferably use two narrow batteries rather than one large one and mount them in like positions upon opposite sides of the rear wheel to secure good balance of the vehicle. The two batteries are indicated at B in Figure 3. The motor is controlled from the handle bar 22 through a rheostat 23, the control handle of which is indicated at 24.

The batteries B may be held in place upon the supporting plates 19 by clamping heads 25 and thumb nuts and bolts 26. Heads 25 are of non-conductive material. The lead from one of the battery terminals 27 is indicated at 28 in Figure 4.

A motor 30 extends lengthwise of post 8 and is clamped to said post by clamp 31. The motor shaft is indicated at 30a and it will be seen that this shaft extends in the general direction of the length of the bicycle frame, rather than crosswise thereof. A reduction gear is provided by the bevel pinions 32 and 33. The shaft 34 of pinion 33 carries one of the elements 35 of an overrunning clutch the other element of the clutch being indicated at 36 and having attached thereto by screws 37 a small sprocket wheel 38, the teeth of which are engaged by the sprocket chain 39. This chain passes over the sprockets 10 and 13 which are the conventional ones of the bicycle. The motor is controlled by the rheostat 23 just as in Figure 1.

This described arrangement not only provides any desired speed reduction between the motor and the sprocket wheel 10 but it disposes the length of the motor generally fore and aft of the bicycle frame rather than crosswise thereof and thereby avoids any possible interference with the legs of the rider when the bicycle is being propelled manually. The crank hanger of a conventional light-weight bicycle is only a few inches in length and consequently the pedal cranks rotate in planes spaced only a few inches from each other. Therefore the legs of the rider will be moving in planes relatively close together and it becomes a matter of importance to provide a mechanism against which the legs of the rider will not strike when the bicycle is being manually propelled. By the arrangement shown the space occupied by the motor is determined by the diameter of the motor and not by its length as would be the case if the motor shaft were disposed crosswise of the bicycle. I further utilize this arrangement to get a desired gear reduction through the bevel gearing shown.

However, the most important advantage of the described arrangement is that while the motor is always connected to the pedals the rider does not have the drag of the motor upon him in propelling the bicycle manually. Further the rider may relieve the batteries of the great drain upon them imposed by the starting of the bicycle by pedaling upon the start off. At this time, see Figures 3 and 6, the outer part of the clutch 36 turns in the direction of the arrow a and the balls 39 move over into the deepest parts of the pockets 40 of the clutch, thus releasing part 35 from engagement with part 36. However, when the rider is ready for the motor to take over the task of propelling the bicycle he manipulates the rheostat to send current to the motor. The part 35 then starts to turn faster than 36, the balls bind between 35 and 36 and the motor propels the bicycle. At this time the rider may rest his feet upon foot rests one of which is indicated at 41. When running down hill, when no power is required, the current is cut off by the rheostat, the motor ceases to move the sprocket wheel and pedals and the rider places his feet upon the pedals ready to actuate the brake of the coaster brake if necessity requires. At this time the rear wheel turns freely through the conventional coaster break mechanism. Not only does the provision of the overrunning clutch permit the starting of the bicycle, manually, to save drain upon the batteries but it also relieves the rider of the drag of the motor if the batteries become exhausted and he has to pedal the bicycle to a place where he can have them charged. By the term fore and aft as used in the specification and claims, I mean that the length of the motor extends in general lengthwise of the bicycle frame in contradistinction to having the length of the motor disposed crosswise of the motor frame as is the case with all other motors used for bicycle propulsion, of which I have knowledge.

While it would be possible to completely disconnect the motor of Figure 1 from sprocket 10 when manually pedaling by merely slipping the belt 15 off of the pulleys 16 and 18, I contemplate the provision of an overrunning clutch like that of Figures 3 and 4 between the motor shaft 17 and sprocket 16 for the purposes above described, when desired. In such case the motor shaft 17 would correspond to shaft 34 of Figures 3 and 4 and the pully 16 would correspond to the small sprocket wheel 38 of Figure 4.

While I have described the connection between sprocket wheel 10 and rear sprocket wheel 12 as being a conventional chain it is to be understood that this term is generically employed and that a belt may be used if desired.

As far as I am aware, I am the first to provide, as an attachment for a conventional light weight bicycle an electric motor having an overrunning clutch between its shaft and the conventional large sprocket wheel of the bicycle said clutch acting in a direction to permit the rotor of the motor to remain motionless when the rider is pedaling. I am aware of the fact that small gasoline engines have been employed as driving attachments upon bicycles with overrunning clutches between the engine shaft and the conventional gearing of the bicycle. However, the conditions surrounding the use of gasoline engines are wholly different from those which apply in the case of electric motor drive and the problems to be overcome are therefore wholly different. Among these differences the following may be mentioned: A gasoline engine has to be cranked while an electric motor does not and most of the prior art overrunning clutches provided for the connection of a gas engine to the bicycle gearing were used to provide means for cranking the engine by pedaling the bicycle. After the engine started, the engine took over the load, thru a manually operated clutch. A further difference between gas engine drive and electric motor drive is that the source of power of the electric motor (the batteries) begins to diminish from the first moment of use while the gas engine develops as much power with the last spoonful of gasoline as when the fuel tank is full. Thus there is no such great reason for care in relieving the gas engine of load when the inertia of starting is being overcome as exists in the case of the battery driven electric motor.

I wish it to be understood that the invention is not limited to the precise construction set forth but that it includes within its purview whatever changes fairly come within either the terms or the spirit of the appended claims.

Having described my invention, what I claim is:

1. The combination with a bicycle of the conventional type which includes a frame, front and rear wheels, a coaster brake assembly in the rear wheel, front and rear sprockets, the front sprocket having attached pedals and the rear sprocket being carried by the rear wheel, of an electric motor secured to the bicycle frame in a position to have its shaft lie fore and aft of the bicycle, reducing gearing connected to the motor shaft and including a shaft which lies transversely of the bicycle frame, a clutch element upon the last named shaft, a second clutch element coacting with the first clutch element to constitute an overrunning clutch, a sprocket chain, a sprocket carried by the second clutch element over which said sprocket chain passes, said chain likewise engaging the front sprocket wheel and the rear sprocket wheel.

2. Power means for driving the front pedal carrying sprocket wheel of a bicycle comprising an electric motor, means for securing said motor to the bicycle frame in such position that its shaft lies in the fore and aft plane of the bicycle frame, a short transverse shaft, bevel gearing between said transverse shaft and the lower end of the motor shaft proportioned to reduce the speed of the transverse shaft with respect to the speed of the motor shaft, a small sprocket wheel upon the outer end of the said short shaft which aligns with and lies in the plane of the pedal carrying sprocket wheel and a driving chain which passes over both of said sprocket wheels.

STEFANOS ARGYRIS.

REFERENCES CITED

The following references are of record in the file of this patent:

UNITED STATES PATENTS

| Number | Name | Date |
|---|---|---|
| 593,678 | Neider | Nov. 16, 1897 |
| 627,066 | Schnepf | June 13, 1899 |
| 670,010 | White | Mar. 19, 1901 |
| 713,467 | MacDonald | Nov. 11, 1902 |
| 1,210,639 | Geisslinger | Jan. 2, 1917 |
| 2,331,976 | Hare | Oct. 19, 1943 |

FOREIGN PATENTS

| Number | Country | Date |
|---|---|---|
| 535,184 | France | Jan. 20, 1922 |